United States Patent
Tsuda

(10) Patent No.: US 7,736,073 B2
(45) Date of Patent: Jun. 15, 2010

(54) IMAGE-CAPTURING APPARATUS, LENS APPARATUS, IMAGE-CAPTURING SYSTEM, METHOD FOR CONTROLLING IMAGE-CAPTURING APPARATUS, AND METHOD FOR CONTROLLING LENS APPARATUS

(75) Inventor: Yuji Tsuda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 797 days.

(21) Appl. No.: 11/470,183

(22) Filed: Sep. 5, 2006

(65) Prior Publication Data

US 2007/0058971 A1 Mar. 15, 2007

(30) Foreign Application Priority Data

Sep. 9, 2005 (JP) ............................. 2005-261574

(51) Int. Cl.
*G03B 17/00* (2006.01)
*G03B 9/00* (2006.01)
*H04N 5/238* (2006.01)
*G02B 9/08* (2006.01)

(52) U.S. Cl. ...................... 396/529; 396/458; 348/363; 359/739; 359/827

(58) Field of Classification Search ................. 396/529, 396/89, 439, 544, 452, 458, 505; 348/207.99, 348/335, 360, 363; 359/703, 819, 827, 738, 359/739

See application file for complete search history.

(56) References Cited

U.S. PATENT DOCUMENTS 6,791,608 B1 * 9/2004 Miyazawa .................. 348/246
2004/0057713 A1 * 3/2004 Ishikawa et al. .............. 396/89

FOREIGN PATENT DOCUMENTS

JP 2003-169248 A 6/2003
JP 2003-177294 A 6/2003

* cited by examiner

*Primary Examiner*—Rochelle-Ann J Blackman
(74) *Attorney, Agent, or Firm*—Canon U.S.A., Inc., IP Division

(57) ABSTRACT

An image-capturing apparatus adapted to receive a detachable lens apparatus having a mechanical shutter includes an image-capturing unit configured to capture an image of a subject, a communication unit configured to enable communication with the lens apparatus, and a control unit configured to perform an image generating operation using a video signal supplied from the image-capturing unit. The control unit controls timing of the image generating operations performed together with a plurality of opening and closing operations of the mechanical shutter on the basis of information received via the communication unit.

10 Claims, 6 Drawing Sheets

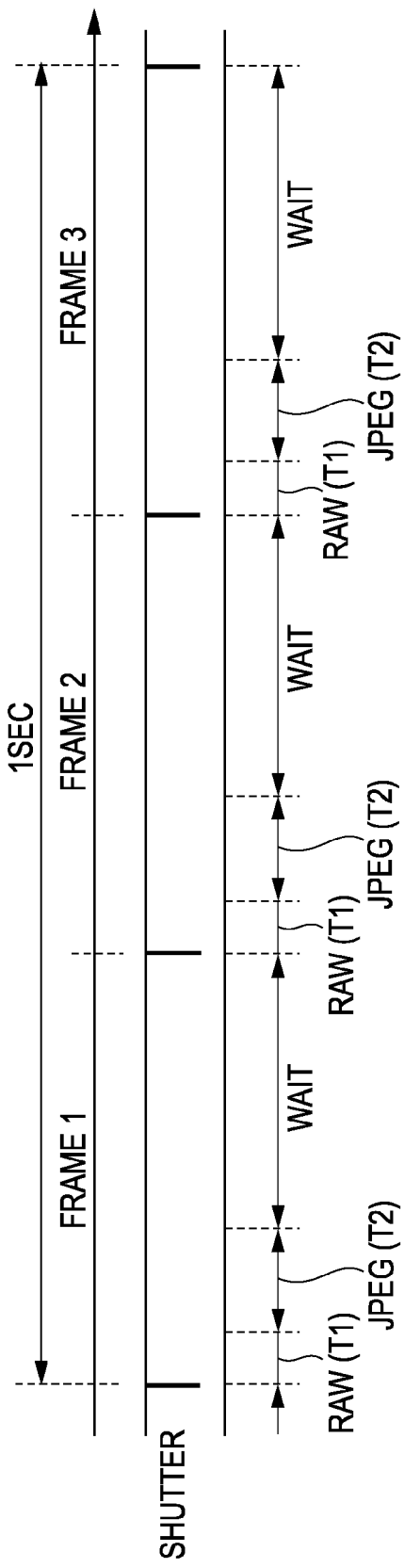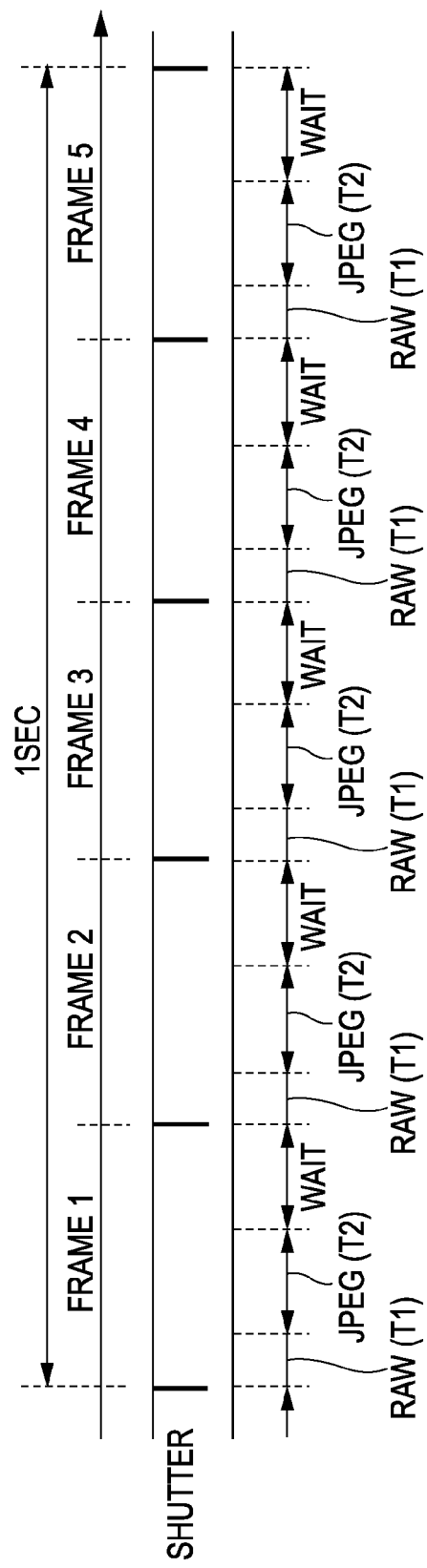

IMAGE-CAPTURING APPARATUS, LENS APPARATUS, IMAGE-CAPTURING SYSTEM, METHOD FOR CONTROLLING IMAGE-CAPTURING APPARATUS, AND METHOD FOR CONTROLLING LENS APPARATUS

BACKGROUND OF THE INVENTION

1. Field of the Invention

The present invention relates to image-capturing apparatuses detachably mounted with lens apparatuses having mechanical shutters, lens apparatuses, image-capturing systems, methods for controlling image-capturing apparatuses, and methods for controlling lens apparatuses.

2. Description of the Related Art

Video cameras, especially those having interlaced imaging devices, such as CCD (Charge Coupled Device) sensors, are capable of shooting not only movies but also fine still images by employing mechanical shutters (see, for example, Japanese Patent Laid-Open No. 2004-724383 (paragraphs 0019 to 0020, FIG. 1) and Japanese Patent Laid-Open No. 2003-169248 (paragraphs 0021 to 0024, FIG. 1)).

In addition, lens apparatuses, which are detachably mounted on video camera systems (i.e., image-capturing apparatuses), having mechanical shutters have been suggested. Furthermore, a continuous shooting function has been introduced to such video cameras. With this feature, users can continuously shoot a plurality of still images by continuously pressing a still image recording switch disposed on such video cameras.

However, to perform a continuous shooting operation with a lens apparatus having a mechanical shutter and an image-capturing apparatus having a continuous shooting function, several conditions have to be met. First, the timing of an opening and closing operation of the mechanical shutter performed in the lens apparatus and that of a continuous shooting operation performed in the image-capturing apparatus have to be synchronized. And second, the opening and closing operation of the mechanical shutter and the continuous shooting operation in the image-capturing apparatus have to be repeated at the same speed.

More specifically, when the image-capturing apparatus has continuous shooting speed of 5 fps (frames per second), the lens apparatus has to perform the opening and closing operation of the mechanical shutter at a speed corresponding to 5 fps. However, synchronization of the timing of the continuous shooting operation and that of the opening and closing operation may be insufficient. Also, the maximum continuous shooting speed of a mechanical shutter varies among different lens apparatuses. For example, the lens apparatus may have a recommended value for the continuous shooting speed (i.e., maximum continuous shooting speed) of less than 5 fps. The recommended value is determined taking the durability of the mechanical shutter into account. In such a case, it is not preferable to perform the opening and closing operation of the mechanical shutter at a speed of 5 times per second or more, exceeding the recommended value, even if an instruction is given by the image-capturing apparatus.

Therefore, it would be desirable for an image-capturing apparatus to capture as many still images as possible in continuous shooting at a speed not exceeding the maximum continuous shooting speed of the mechanical shutter disposed in each lens apparatus.

SUMMARY OF THE INVENTION

Exemplary embodiments of the present invention are provided which enable the timing of the continuous shooting operation performed in the image-capturing apparatus and that of the corresponding operation performed in the lens apparatus to be synchronized. Furthermore, the exemplary embodiments of the present invention enable the continuous shooting operation in the image-capturing apparatus to be controlled in accordance with the capability of the lens apparatus.

According to an aspect of the present invention, an image-capturing apparatus is provided which is adapted to receive a detachable lens apparatus having a mechanical shutter. The image-capturing apparatus includes an image-capturing unit configured to capture an image of a subject; a communication unit configured to enable communication with the lens apparatus; and a control unit configured to perform an image generating operation using a video signal supplied from the image-capturing unit. The control unit controls timing of the image generating operations performed together with a plurality of opening and closing operations of the mechanical shutter on the basis of information received via the communication unit.

According to another aspect of the present invention, the information is regarding the mechanical shutter disposed in the lens apparatus. According to another aspect of the present invention, the information indicates a number of images continuously capturable with the mechanical shutter within a predetermined period. And, according to yet another aspect of the present invention, the control unit continuously performs the still image generating operations together with the opening and closing operations of the mechanical shutter.

According to yet another aspect of the present invention, there is provided a lens apparatus detachably mounted on an image-capturing apparatus. The lens apparatus includes a mechanical shutter configured to perform an opening and closing operation; a storage unit configured to store information used when the mechanical shutter repeats the opening and closing operation a plurality of times; and a communication unit configured to allow the lens apparatus to send the information to the image-capturing apparatus.

Moreover, according to still yet another aspect of the present invention, the information is used for controlling a continuous shooting operation performed in the image-capturing apparatus. Additionally, according to another aspect of the present invention, the information indicates a number of images continuously capturable with the mechanical shutter within a predetermined period.

Furthermore, according to another aspect of the present invention, an image-capturing system is provided which includes a lens apparatus having a mechanical shutter; and an image-capturing apparatus detachably mounted to the lens apparatus. The image-capturing apparatus includes an image-capturing unit configured to capture an image of a subject; a communication unit configured to enable communication with the lens apparatus; and a control unit configured to perform an image generating operation using a video signal supplied from the image-capturing unit. Here, the control unit controls timing of the image generating operations performed together with a plurality of opening and closing operations of the mechanical shutter on the basis of information received via the communication unit.

And, according to another aspect of the present invention, a method is provided for controlling an image-capturing apparatus detachably mounted to a lens apparatus having a mechanical shutter. The image-capturing apparatus includes an image-capturing unit configured to capture an image of a subject; a communication unit configured to enable communication with the lens apparatus; and a control unit configured to perform an image generating operation using a video signal supplied from the image-capturing unit. Here, the method includes capturing an image of a subject and supplying a video signal of the image to the control unit; communicating with the lens apparatus; performing an image generating operation using the supplied video signal; and controlling, on the basis of information received via the communication with the lens apparatus, timing of the image generating operation performed together with a plurality of opening and closing operations of the mechanical shutter.

Additionally, according to yet another aspect of the present invention, a method is provided for controlling a lens apparatus detachably mounted on an image-capturing apparatus. The method includes performing an opening and closing operation of a mechanical shutter; reading out information, used when the opening and closing operation of the mechanical shutter is repeated a plurality of times, from a storage unit; and sending the information to the image-capturing apparatus.

Also, according to still yet another aspect of the present invention, a computer readable medium is provided which includes computer-executable instructions for controlling an image-capturing apparatus detachably mounted to a lens apparatus having a mechanical shutter, the image-capturing apparatus including an image-capturing unit configured to capture an image of a subject; a communication unit configured to enable communication with the lens apparatus; and a control unit configured to perform an image generating operation using a video signal supplied from the image-capturing unit. Here, the computer readable instructions include computer-executable instructions for capturing an image of a subject and supplying a video signal of the image to the control unit; computer-executable instructions for communicating with the lens apparatus; computer-executable instructions for performing an image generating operation using the supplied video signal; and computer-executable instructions for controlling, on the basis of information received via the communication with the lens apparatus, timing of the image generating operation performed together with a plurality of opening and closing operations of the mechanical shutter.

Moreover, according to yet another aspect of the present invention, a computer readable medium is provided which contains computer-executable instructions for controlling a lens apparatus detachably mounted on an image-capturing apparatus. The medium includes computer-executable instructions for performing an opening and closing operation of a mechanical shutter; computer-executable instructions for reading out information, used when the opening and closing operation of the mechanical shutter is repeated a plurality of times, from a storage unit; and computer-executable instructions for sending the information to the image-capturing apparatus.

Further features and aspects of the present invention will become apparent from the following description of exemplary embodiments with reference to the attached drawings.

BRIEF DESCRIPTION OF THE DRAWINGS

FIG. 5 is a timing chart showing an example relationship between a WAIT timer set when maximum continuous shooting speed is 3 fps and processing timing of continuous shooting operation according to an exemplary embodiment of the present invention.

FIG. 6 is a timing chart showing an example relationship between a WAIT timer set when maximum continuous shooting speed is 5 fps and processing timing of continuous shooting operation according to an exemplary embodiment of the present invention.

DESCRIPTION OF THE EMBODIMENTS

Exemplary embodiments, features and aspects of the present invention will be described below with reference to the accompanying drawings.

[Exemplary Image-Capturing System]

Figure 7:
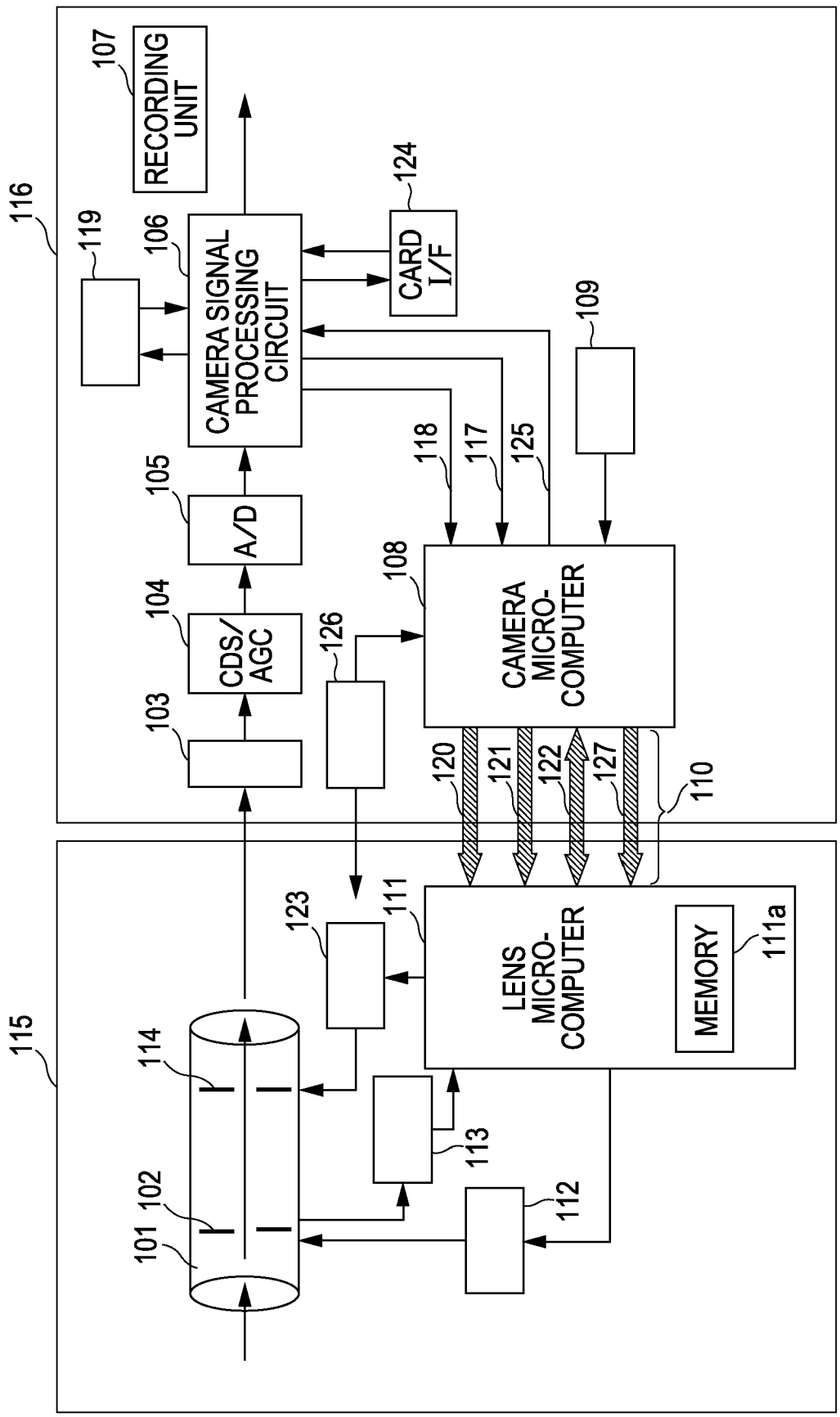
FIG. 7 is a block diagram showing an example configuration of an image-capturing system according to an exemplary embodiment of the present invention.

FIG. 7 shows an example configuration of an image-capturing system according to an exemplary embodiment of the present invention. The image-capturing system according to the exemplary embodiment includes a video camera body (hereinafter, simply referred to as "camera body") 116 and an interchangeable lens (i.e., a lens apparatus) 115 detachably mounted on the camera body 116.

The interchangeable lens 115 includes an imaging lens 101, an iris 102, an aperture control circuit 112, an aperture value detecting circuit 113, and a mechanical shutter 114. The iris 102 adjusts the amount of light allowed to enter the interchangeable lens 115. The aperture control circuit 112 controls the iris 102. The aperture value detecting circuit 113 detects the aperture value of the iris 102. The mechanical shutter 114 blocks propagation of the incident light from the subject to imaging devices 103 disposed in the camera body 116.

The interchangeable lens 115 also includes a mechanical shutter control circuit 123 and a lens microcomputer 111. The mechanical shutter control circuit 123 enables the mechanical shutter 114 to operate at high-speed. The lens microcomputer 111 controls various operations performed in the interchangeable lens 115. Also a memory 111a resides in the lens microcomputer 111.

The camera body 116 includes the imaging devices 103, a CDS/AGC (Correlated Double Sampling/Automatic Gain Control) circuit 104, an A/D (Analog-to-Digital) converter 105, and a camera signal processing circuit 106. The imaging devices 103 are, for example, CCD (Charge Coupled Device) sensors or CMOS (Complementary Metal Oxide Semiconductor) sensors. The A/D converter 105 digitalizes analog video signals. The imaging devices 103, the CDS/AGC circuit 104, the A/D converter 105, the camera signal processing circuit 106 serve as image-capturing components. The camera body 116 also includes a recording unit 107 and an SDRAM (Synchronous Dynamic Random Access Memory) 119. The recording unit 107 records video signals and still image signals on a recording medium. The SDRAM 119 temporarily stores the video signals having undergone the predetermined processing by the camera signal processing circuit 106.

In addition, the camera body 116 includes signal paths 117 and 118. The signal path 117 is used for transmitting a vertical synchronizing signal VD generated by the camera signal processing circuit 106. The signal path (hereinafter, referred to as "AE detection signal path") 118 is used for transmitting integrated data of brightness information generated by the camera signal processing circuit 106.

The camera body 116 also includes a camera microcomputer 108 for controlling various operations performed in the camera body 116. Buses 110 are disposed at a lens mount for connecting the camera body 116 and the interchangeable lens 115. The buses 110 allow the camera microcomputer 108 and the lens microcomputer 111 to communicate and exchange various information with each other. The camera microcomputer 108 sends clock signals (CLK) 121 and command signals (CS) 127 to the lens microcomputer 111 through the buses 110. The clock signals 121 are timing signals allowing the camera microcomputer 108 and the lens microcomputer 111 to operate synchronously. Additionally, the camera microcomputer 108 and the lens microcomputer 111 send data signals (DATA) 122 to each other. The interchangeable lens 115 is supplied with electric power from the camera body 116 through the lens mount.

The camera body 116 further includes a still image recording switch 109, a signal path 125, a card I/F (interface) 124, and a lens detecting circuit 126. The still image recording switch 109 is manipulated to record still images. The signal path 125 is used for transmitting a command signal for generating still images (hereinafter, referred to as "still image recording execution signal"). The still image recording execution signal is generated by the camera microcomputer 108 in response to a user's manipulation of the still image recording switch 109. The card I/F 124 enables recording of the generated still images onto a semiconductor memory device (not shown), such as a memory card. The lens detecting circuit 126 detects the interchangeable lens 115 mounted on the camera body 116. If mounted on the camera body 116, the interchangeable lens 115 is supplied with electric power from the camera body 116 via the power bus 120. An optical image of the subject is formed on the imaging devices 103 by the imaging lens 101, the amount of light being adjusted by the iris 102.

The CDS/AGC circuit 104 performs noise removal and gain control operations on the analog video signal resulting from photoelectric conversion performed by the imaging devices 103. The analog video signal is then digitalized by the A/D converter 105, and supplied to the camera signal processing circuit 106.

The camera signal processing circuit 106 processes the digitalized video signal to generate a video signal that is compliant with a standard. The standardized video signal is supplied to the recording unit 107 in the digital form, and recorded on the recording medium (not shown), such as a magnetic tape and an optical disc.

The camera signal processing circuit 106 extracts and integrates the brightness information from the digital video signal so as to generate a detection signal for automatic exposure control (hereinafter, referred to as "AE detection signal"). The AE detection signal is supplied to the camera microcomputer 108 via the AE detection signal path 118. The camera microcomputer 108, in turn, sends the AE detection signal as the data signal DATA 122 to the lens microcomputer 111.

The lens microcomputer 111 causes the aperture control circuit 112 to output an aperture control signal so as to maintain the received AE detection signal (i.e., the amount of the light from the subject) at a constant level. The iris 102 is driven in accordance with the aperture control signal supplied from the aperture control circuit 112.

The user manipulates the still image recording switch 109 disposed on the camera body 116 to shoot a still image. In response to the user's manipulation, the camera microcomputer 108 supplies the camera signal processing circuit 106 with the still image recording execution signal. Upon receiving the signal, the camera signal processing circuit 106 generates a still image from the digital video signal, and records the generated image on the SDRAM 119. The still image data temporarily recorded on the SDRAM 119 is then recorded on the memory device, such as a memory card, via the card I/F 124.

At this time, if the user continuously manipulates the still image recording switch 109 (e.g., if the user presses the switch for a long time), a continuous shooting operation is performed. In the continuous shooting operation, a plurality of still images are captured at predetermined intervals and recorded. The camera signal processing circuit 106 serves as continuous shooting means.

The allowable number of opening and closing operations per second (hereinafter, referred to as "maximum continuous shooting speed") is determined for the mechanical shutter 114 disposed in the interchangeable lens 115. The maximum continuous shooting speed is determined in a process of designing or manufacturing the interchangeable lens 115. At this time, the capability and durability of the mechanical shutter 114 as a mechatronic part and the electric characteristics shown when the mechanical shutter 114 is controlled via the mechanical shutter control circuit 123 are considered. Information on the maximum continuous shooting speed is written in a memory 111a disposed in the lens microcomputer 111 at the time of manufacturing or adjusting the interchangeable lens 115. The maximum continuous shooting speed may be determined on the basis of a timing at which the mechanical shutter 114 can perform the opening and closing operation.

FIG. 7 shows only one interchangeable lens 115. However, the camera body 116 according to the exemplary embodiment is capable of mounting a plurality of interchangeable lenses of a suitable lens mount type. Suppose there are two interchangeable lenses. An interchangeable lens A has, for example, the maximum continuous shooting speed of 3 fps (frames per second). An interchangeable lens B, whose capability and durability are better than those of the interchangeable lens A, has, for example, the maximum continuous shooting speed of 5 fps. The number of still images capturable per second, i.e., 3, is written in the memory 111a of the interchangeable lens A. Similarly, the number of still images capturable per second, i.e., 5, is written in the memory 111a of the interchangeable lens B.

In an ordinary shooting mode (i.e., a single image shooting mode), if the user manipulates the still image recording switch 109, the camera microcomputer 108 sends a command signal for closing the mechanical shutter 114 to the lens microcomputer 111.

The lens microcomputer 111 causes the mechanical shutter 114 to close via the mechanical shutter control circuit 123 in accordance with the received command signal. In synchronization with closing of the mechanical shutter 114, the camera body 116 performs a signal processing operation for generating still images. The signal processing operation includes the following steps. The camera body 116 first generates an image (i.e., RAW data), which is a still image to be recorded, using a signal supplied, after the mechanical shutter 114 has closed, from the imaging devices 103. The camera body 116 then compresses the generated image (i.e., RAW image) to create a JPEG file recordable on the memory device such as a memory card. The camera body 116 records the JPEG file on the memory device via the card I/F 124.

If the user continues to manipulate the still image recording switch 109, the above-described still image generating and recording operations accompanied with opening and closing operations of the mechanical shutter 114 are repeated. In the exemplary embodiment, the timing of starting the still image generating operation using the signal supplied from the imaging devices 103 is controlled by a WAIT timer. The WAIT timer controls the timing of a continuous shooting operation, and is described below.

[Exemplary Initialization Operations]

Figure 1:
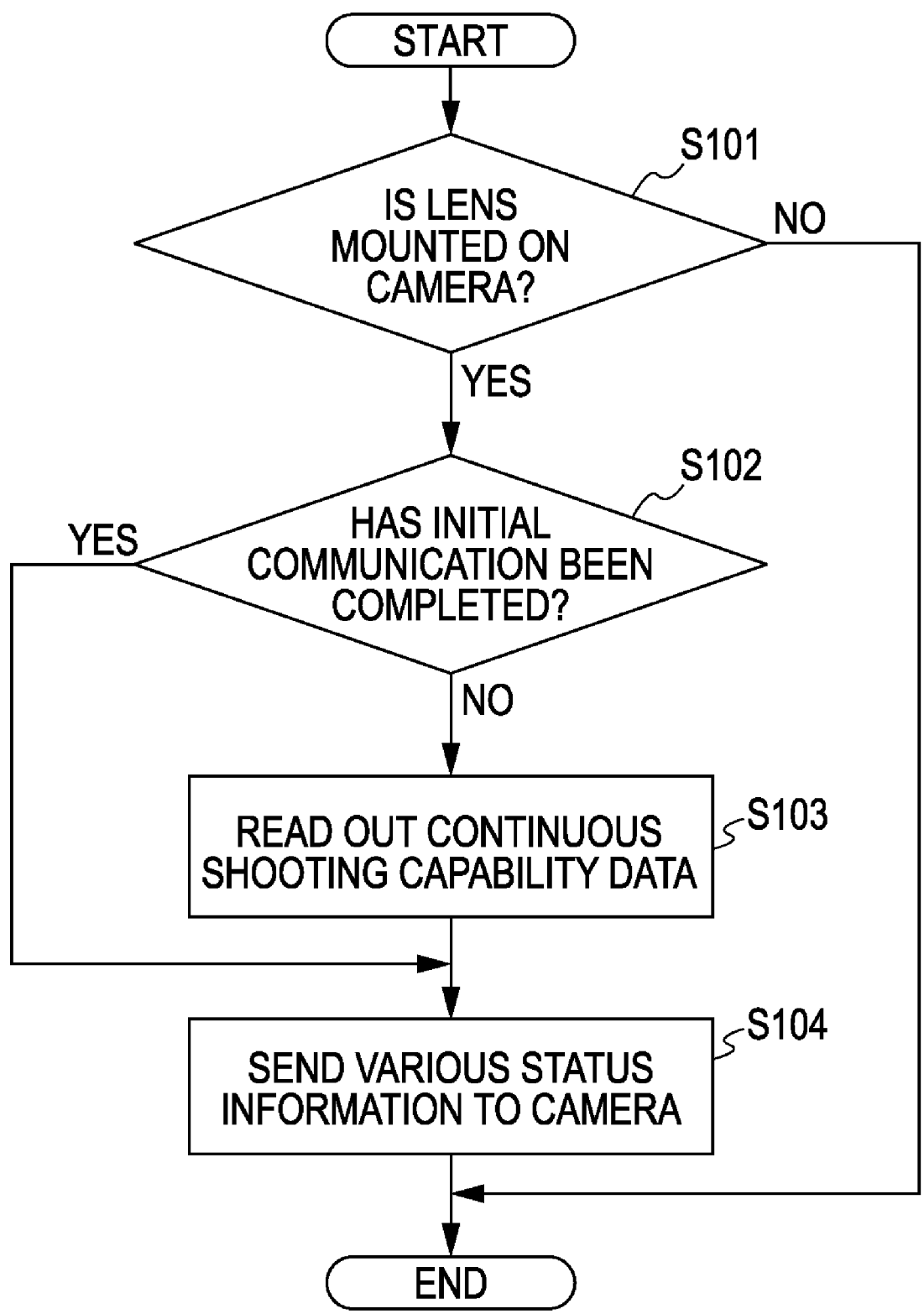
FIG. 1 is a flowchart showing an example operation performed in an interchangeable lens according to an exemplary embodiment of the present invention.

Now, referring to the flowchart shown in FIG. 1, an exemplary initialization operation performed in the interchangeable lens 115 is described. A computer program stored in the internal memory of the lens microcomputer 111 enables this operation to be executed.

At STEP 101, the lens microcomputer 111 determines whether or not the interchangeable lens 115 is mounted on the camera body 116. More specifically, the lens microcomputer 111 determines whether or not the power 120, the clock signal CLK 121, the data signal DATA 122, and the command signal CS 127 are supplied thereto in a predetermined protocol.

If the lens microcomputer 111 determines that the interchangeable lens 115 is mounted on the camera body 116 (YES in STEP 101), the process proceeds to STEP 102. If the lens microcomputer 111 determines that the interchangeable lens 115 is not mounted on the camera body 116 (NO in STEP 101), the process ends. At STEP 102, the lens microcomputer 111 determines whether or not initial communication has been completed. In the initial communication, the camera body 116 and the interchangeable lens 115 exchange characteristic data thereof in a predetermined protocol.

If the lens microcomputer 111 determines that the initial communication has been completed (YES in STEP 102), the process proceeds to STEP 104. If the lens microcomputer 111 determines that the initial communication has not been completed (NO in STEP 102), the process proceeds to STEP 103. At STEP 103, the lens microcomputer 111 reads out the information on the maximum continuous shooting speed (hereinafter, also referred to as "continuous shooting capability data") from the memory 111a. As mentioned above, the read out information indicates the continuous shooting capability of the mechanical shutter 114.

The maximum continuous shooting speed information is for notifying the camera microcomputer 108 of the maximum continuous shooting speed corresponding to the capabilities and characteristics of the interchangeable lens 115. The maximum continuous shooting speed information varies with the capabilities or characteristics of the mechanical shutter 114 and mechanical shutter control circuit 123 of individual interchangeable lens 115. At STEP 104, the lens microcomputer 111 sends the maximum continuous shooting speed information and various status information as the data signals DATA 122 to the camera microcomputer 108. The status information includes the information on the features of the interchangeable lens 115.

Figure 2:
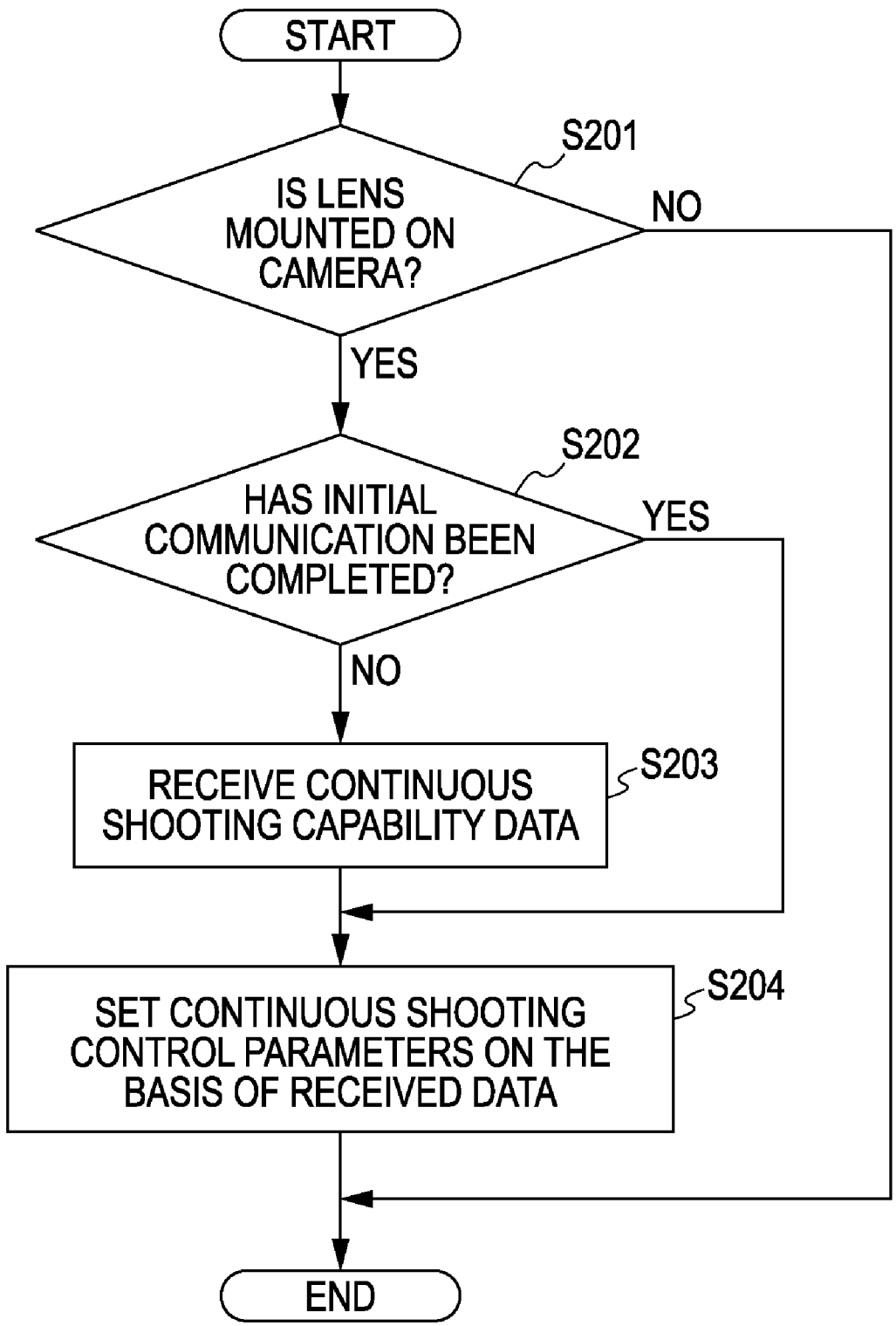
FIG. 2 is a flowchart showing an example operation performed in a video camera according to an exemplary embodiment of the present invention.

Now, referring to a flowchart of FIG. 2, an exemplary initialization operation performed in the camera body 116 is described. A computer program stored in the internal memory of the camera microcomputer 108 enables this operation and the operations described below to be executed.

At STEP S201, the camera microcomputer 108 first determines whether or not the interchangeable lens 115 is mounted on the camera body 116. More specifically, upon mechanically detecting the interchangeable lens 115 mounted on the camera body 116, the lens detecting circuit 126 supplies the camera microcomputer 108 with an electric signal. Thus, the camera microcomputer 108 performs this determination via the lens detecting circuit 126. If the camera microcomputer 108 determines that the interchangeable lens 115 is not mounted (NO in STEP 201), the process ends. If the camera microcomputer 108 determines the interchangeable lens 115 is mounted (YES in STEP 201), the process proceeds to STEP 202.

At STEP 202, the camera microcomputer 108 determines whether or not the initial communication described above has been completed. If the camera microcomputer 108 determines that the initial communication has been completed (YES in STEP 202), the process proceeds to STEP 204. If the camera microcomputer 108 determines that the initial communication has not been completed (NO in STEP 202), the process proceeds to STEP 203. At STEP 203, the camera microcomputer 108 receives the continuous shooting capability data sent from the interchangeable lens 115.

At STEP 204, the camera microcomputer 108 sets control parameters on the basis of the continuous shooting capability data. The control parameters are used in a continuous shooting operation of still images performed in the camera body 116. More specifically, the camera microcomputer 108 sets various control parameters so as to enable the optimum continuous shooting operation suitable for the maximum continuous shooting speed of the mechanical shutter 114 disposed in the interchangeable lens 115. The control parameters are, for example, the continuous shooting speed (X fps) of the camera body 116, a value of a WAIT timer establishing intervals of the still image generating operations during continuous shooting, and contents of processing for generating the continuously shot still images from the video signal. The set control parameters are stored in the internal memory of the camera microcomputer 108.

[Exemplary Still Shooting Operation]

Figure 3:
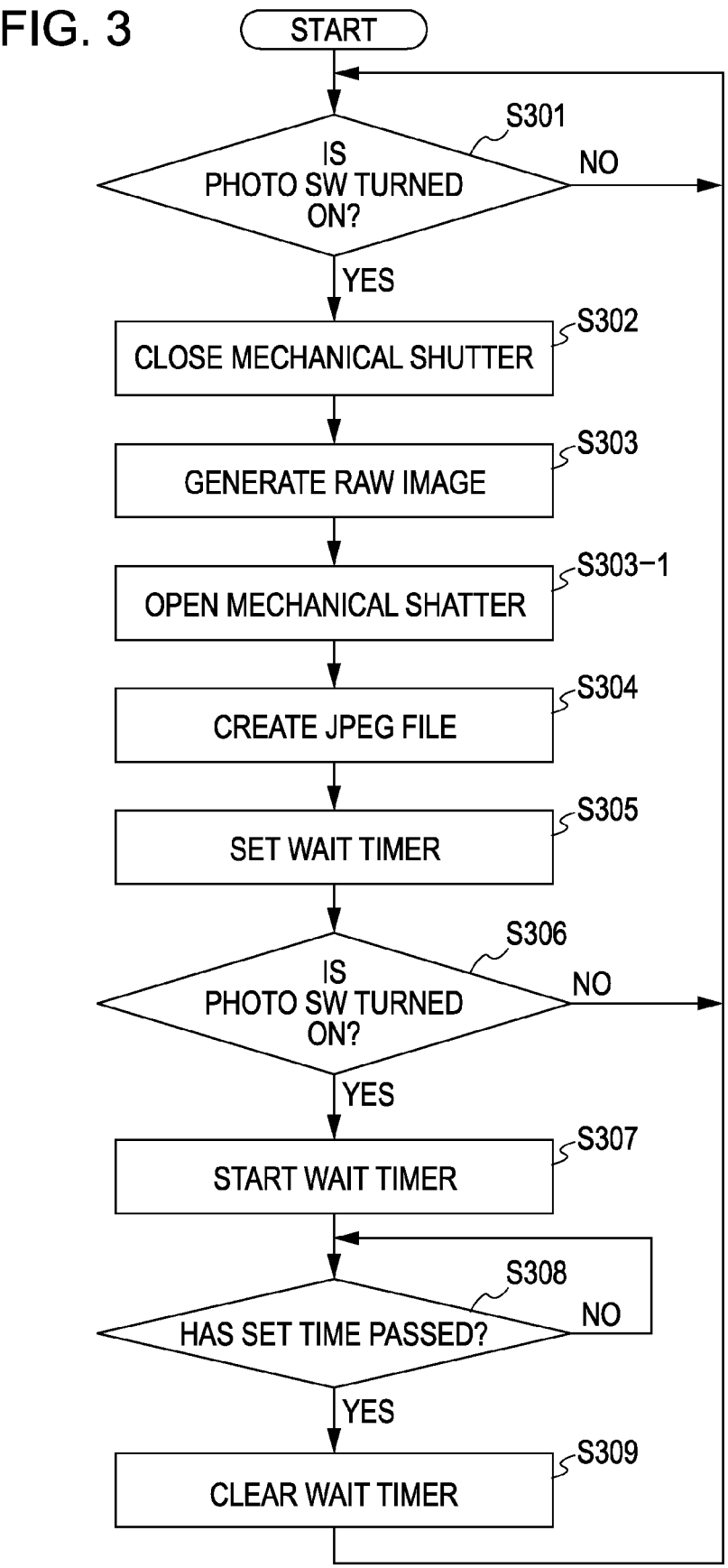
FIG. 3 is a flowchart showing an example operation performed in a video camera according to an exemplary embodiment of the present invention.

Now, referring to a flowchart of FIG. 3, an exemplary still image shooting (i.e., generating and recording) operation performed in the camera body 116 will be described next. At STEP 301, the camera microcomputer 108 determines whether or not the still image recording switch (in FIG. 3, shown as "photo SW") 109 is turned on. If the camera microcomputer 108 determines that the still image recording switch 109 is not turned on (NO in STEP 301), STEP 301 is repeated. If the camera microcomputer 108 determines that the still image recording switch 109 is turned on (YES in STEP 301), the process proceeds to STEP 302.

At STEP 302, the camera microcomputer 108 causes the mechanical shutter 114 to close. More specifically, the camera microcomputer 108 sends a command signal CS 127 for closing the mechanical shutter 114 to the lens microcomputer 111. The lens microcomputer 111, in turn, causes the mechanical shutter 114 to close via the mechanical shutter control circuit 123 according to the received command signal.

At STEP 303, in synchronization with closing of the mechanical shutter 114, the camera microcomputer 108 performs an image (RAW data) (i.e., a still image) generating operation. More specifically, the camera microcomputer 108 alternatively reads out charges from the imaging devices 103 disposed in the even lines EVEN and disposed in the odd lines ODD to form an image signal for one frame. The read out analog image signal is, after going through the gain control operation by the CDS/AGC circuit 104, digitalized by the A/D converter 105. The camera signal processing circuit 106 then performs various processings on the digitalized image signal to generate the image (RAW image). The generated image (RAW image) data is stored in the SDRAM 119.

Since the image (i.e., RAW image) has been generated at STEP 303, an opening operation of the mechanical shutter 114 is performed at following STEP 303-1. More specifically, the camera microcomputer 108 sends a command signal for opening the mechanical shutter 114 to the lens microcomputer 111 as the CS 127. In response to the received command signal, the lens microcomputer 111 causes the mechanical shutter 114 to open via the mechanical shutter control circuit 123.

It is noted that the timing with which the camera signal processing circuit 106 generates the image (RAW image) depends on the timing with which the camera microcomputer 108 supplies the camera signal processing circuit 106 with the still image recording execution signal.

At STEP 304, the camera microcomputer 108 creates a JPEG file such that the image (RAW data) becomes recordable on the memory device such as a memory card. At STEP 305, the camera microcomputer 108 sets the value of the WAIT timer in preparation for the continuous shooting operation. As mentioned above, the value of the WAIT timer is included in the control parameters set at STEP 204 on the basis of the continuous shooting capability data received from the interchangeable lens 115 at STEP 203. The value of the WAIT timer is set so that the continuous shooting operation is performed at a speed not exceeding the maximum continuous shooting speed of the mechanical shutter 114. This prevents the mechanical shutter 114 from having excessive load, whereby the interchangeable lens 115 can avoid the durability problem. The setting operation of the WAIT timer will be described in detail below.

At STEP 306, the camera microcomputer 108 again determines whether or not the still image recording switch 109 is turned on. If the camera microcomputer 108 determines that the still image recording switch 109 is not turned on (in the case of the single image shooting mode) (NO in STEP 306), the process returns to STEP 301. If the camera microcomputer 108 determines that the still image recording switch 109 is turned on, i.e., that a long press operation has been performed on the still image recording switch 109 (YES in STEP 306), the process proceeds to STEP 307.

At STEP 307, the camera microcomputer 108 starts the WAIT timer. At STEP 308, the camera microcomputer 108 determines whether or not the count of the WAIT timer has reached the value set for the WAIT timer (i.e., the WAIT timer has expired). If the WAIT timer has not expired (NO in STEP 308), STEP 308 is repeated. If the WAIT timer has expired (YES in STEP 308), the process proceeds to STEP 309. At STEP 309, the camera microcomputer 108 clears the value of the WAIT timer, and the process returns to STEP 301. If the still image recording switch 109 is determined to be ON at STEP 301, STEPs 302 to 304 are executed, so that a second still image is captured. Thereafter, the continuous shooting operations continue, repeating the above-described steps.

[Exemplary WAIT Timer Setting Operation]

Figure 4:
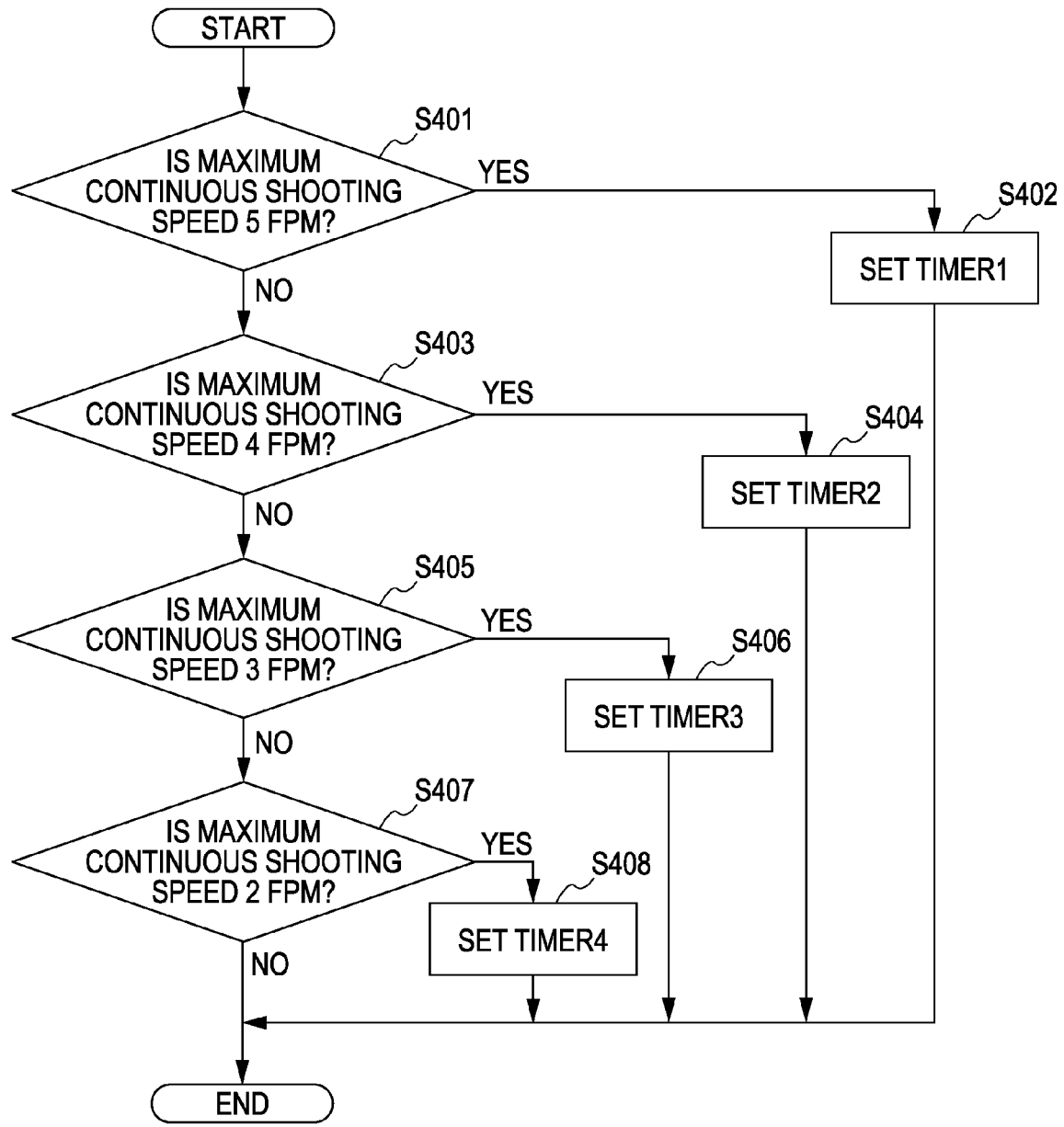
FIG. 4 is a flowchart showing an example operation performed in a video camera according to an exemplary embodiment of the present invention.

Now referring to a flowchart of FIG. 4, an exemplary setting operation of the WAIT timer performed at STEP 204 in FIG. 2 is described. It is assumed that the camera body 116 has the maximum continuous shooting speed of 5 fps.

At STEP 401, the camera microcomputer 108 determines whether or not the maximum continuous shooting speed indicated by the continuous shooting capability data sent from the interchangeable lens 115 is 5 fps. If the maximum continuous shooting speed is 5 fps (YES in STEP 401), the process proceeds to STEP 402. At STEP 402, the camera microcomputer 108 sets the timer 1 as the WAIT timer. The timer 1 provides a wait time allowing each still image generating operation (including the image (RAW image) generating operation and the JPEG file creating operation) to start at the constant intervals when the operation is performed five times per second.

In addition, the value of the WAIT timer may be set as the time between the completion of the JPEG file creating operation and the start of the next image (RAW image) generating operation. The value may be set as the time between the starting of consecutive image (RAW image) generating operations. For example, the value may be set as the time between the starting of a first image (RAW image) generating operation and the starting of a second image (RAW image) generating operation. Alternatively, the value of the WAIT timer may be set as the time between the completions of the consecutive image (RAW image) generating operations (i.e., the starting of the consecutive JPEG file creating operations). The still image generating operation in the camera body 116 may be performed at any timing as long as the timing is suitable for the continuous shooting capability of the mechanical shutter 114 in the interchangeable lens 115.

If the maximum continuous shooting speed is determined not to be 5 fps (NO in STEP 401), the process proceeds to STEP 403. At STEP 403, the camera microcomputer 108 determines whether or not the maximum continuous shooting speed is 4 fps. If the maximum continuous shooting speed is 4 fps (YES in STEP 403), the process proceeds to STEP 404. At STEP 404, the camera microcomputer 108 sets the timer 2 as the WAIT timer. The timer 2 provides a wait time, longer than that of the above-described timer 1, allowing each still image generating operation (including the image (RAW image) generating operation and the JPEG file creating operation) to start at the constant intervals when the operation is performed four times per second.

If the maximum continuous shooting speed is determined not to be 4 fps (NO in STEP 403), the process proceeds to STEP 405. At STEP 405, the camera microcomputer 108 determines whether or not the maximum continuous shooting speed is 3 fps. If the maximum continuous shooting speed is 3 fps (YES in STEP 405), the process proceeds to STEP 406. At STEP 406, the camera microcomputer 108 sets the timer 3 as the WAIT timer. The timer 3 provides a wait time, longer than that of the above-described timer 2, allowing each still image generating operation (including the image (RAW image) generating operation and the JPEG file creating operation) to start at the constant intervals when the operation is performed three times per second.

If the maximum continuous shooting speed is determined not to be 3 fps (NO in STEP 405), the process proceeds to STEP 407. At STEP 407, the camera microcomputer 108 determines whether or not the maximum continuous shooting speed is 2 fps. If the maximum continuous shooting speed is 2 fps (YES in STEP 407), the process proceeds to STEP 408. At STEP 408, the camera microcomputer 108 sets the timer 4 as the WAIT timer. The timer 4 provides a wait time, longer than that of the above-described timer 3, allowing each still image generating operation (including the image (RAW image) generating operation and the JPEG file creating operation) to start at the constant intervals when the operation is performed twice per second. If the maximum continuous shooting speed is determined not to be 2 fps (NO in STEP 407), the process ends.

As described above, FIG. 5 shows an exemplary relationship between the WAIT timer (i.e., the timer 3) and the processing timing of the continuous shooting operation. For example, FIG. 5 shows a case where the interchangeable lens A having the maximum continuous shooting speed of 3 fps is mounted.

Additionally, FIG. 6 shows the relationship between the WAIT timer (i.e., the timer 1) and the processing timing of the continuous shooting operation. FIG. 6 shows a case where the interchangeable lens B having the maximum continuous shooting speed of 5 fps is mounted.

A time necessary for generating a still image is composed of the times required for performing the image (RAW image) generating operation and the JPEG file creating operation, and is constant. Thus, the value of the WAIT timer becomes shorter as the number of still image generating operations per second increases (i.e., the continuous shooting speed increases). In contrast, the value of the WAIT timer becomes longer as the number of still image generating operations decreases. More specifically, suppose the times necessary for the image (RAW image) generating operation and the JPEG file creating operation are denoted as T1 and T2, respectively. The value of the WAIT timer is represented as:

1 (sec)÷continuous shooting speed (X fps)−T1−T2.

Accordingly, the interval between the still image generating operations varies depending on the continuous shooting speed.

Setting the value of the WAIT timer in accordance with the capability of the mechanical shutter 114 disposed in the interchangeable lens 115 enables the continuous shooting operation to be performed at the maximum continuous shooting speed that is allowed for the mechanical shutter 114 (i.e., ultimately the mounted interchangeable lens 115). In addition, application of excessive load to the mechanical shutter 114 is avoided.

As described above, in the exemplary embodiment, the interchangeable lens 115 sends the continuous shooting capability data of the mechanical shutter 114 included therein to the camera body 116. The camera body 116 sets the optimum interval (i.e., the WAIT timer) between still image generating operations during continuous shooting on the basis of the received data. Accordingly, the timing of opening and closing operation of the mechanical shutter and that of the continuous shooting operation are synchronized, thereby avoiding degradation in the quality of the continuously shot still images. In addition, the camera body 116 can get the maximum continuous shooting capability out of the mechanical shutter 114 disposed in the interchangeable lens 115. Accordingly, the camera body 116 can perform the continuous shooting operations at the maximum speed that is allowed for the mechanical shutter 114.

Other Exemplary Embodiments

In the above-described embodiment, information on the maximum continuous shooting speed, indicating the number of still images continuously capturable within a predetermined period, of the mechanical shutter is sent from the interchangeable lens to the camera body. However, in the present invention, information to be sent from a lens apparatus to an image-capturing apparatus is not limited to this particular information.

For example, when the lens apparatus performs control operations on focus and an iris prior to each still image generating operation during continuous shooting, the continuous shooting speed of the image-capturing apparatus depends on the time necessary for these control operations performed in the lens apparatus. In such a case, the lens apparatus may send the information on the time necessary for the control operations to the image-capturing apparatus. The image-capturing apparatus then sets the continuous shooting speed (i.e., the WAIT timer) on the basis of the received information.

While the present invention has been described above, it is to be understood that the invention is not limited to contents disclosed in the exemplary embodiments. The present invention can be applied to any configuration that can achieve the functions described in the appended claims or the functions of the configurations described in the exemplary embodiments.

For example, software configurations and hardware configurations of the above-described exemplary embodiments may be appropriately switched.

Furthermore, the above-described exemplary embodiments of the present invention or the technical elements of these embodiments may be combined as needed.

In the present invention, the configurations disclosed in claims or whole or part of configurations of the exemplary embodiments may form a single apparatus, may be combined with another apparatus, or may be used as a component of an apparatus.

The present invention can be applied to various types of camera such as video cameras capable of capturing still images, electronic cameras such as digital cameras, cameras detachably mounted with interchangeable lenses, single lens reflex cameras, lens shutter cameras, and surveillance cameras. In addition, the present invention can be applied to image-capturing apparatuses other than cameras, optical apparatuses, and other apparatuses. Furthermore, the present invention can be applied to devices, methods, and computer programs employed in the above-mentioned cameras, image-capturing apparatuses, optical apparatuses, and other apparatuses, and to components of these cameras and apparatuses.

This application claims the benefit of Japanese Application No. 2005-261574 filed Sep. 9, 2005, which is hereby incorporated by reference herein in its entirety.

What is claimed:

1. An image-capturing apparatus to receive a detachable lens apparatus having an iris and a mechanical shutter, the image-capturing apparatus comprising:
   an image-capturing unit configured to capture an image of a subject;
   a communication unit configured to enable communication with the lens apparatus; and
   a control unit configured to perform an image generating operation using a video signal supplied from the image-capturing unit,
   wherein the control unit controls timing of the image generating operations performed together with a plurality of opening and closing operations of the mechanical shutter on the basis of information received via the communication unit,
   wherein the information is regarding the mechanical shutter disposed in the lens apparatus.

2. The apparatus according to claim 1, wherein the information indicates a number of images continuously capturable with the mechanical shutter within a predetermined period.

3. The apparatus according to claim 1, wherein the control unit continuously performs the still image generating operations together with the opening and closing operations of the mechanical shutter.

4. A lens apparatus detachably mounted on an image-capturing apparatus, the lens apparatus comprising:
   an iris;
   a mechanical shutter configured to perform an opening and closing operation;

a storage unit configured to store information used when the mechanical shutter repeats the opening and closing operation a plurality of times; and a communication unit configured to allow the lens apparatus to send the information to the image-capturing apparatus, wherein the information is used for controlling shooting operation performed in the image-capturing apparatus.

5. The apparatus according to claim 4, wherein the information indicates a number of images continuously capturable with the mechanical shutter within a predetermined period.

6. An image-capturing system comprising:

a lens apparatus having an iris and a mechanical shutter; and an image-capturing apparatus detachably mounted to the lens apparatus, the image-capturing apparatus including, an image-capturing unit configured to capture an image of a subject;

a communication unit configured to enable communication with the lens apparatus; and a control unit configured to perform an image generating operation using a video signal supplied from the image-capturing unit, wherein the control unit controls timing of the image generating operations performed together with a plurality of opening and closing operations of the mechanical shutter on the basis of information received via the communication unit, wherein the information is regarding the mechanical shutter disposed in the lens apparatus.

7. A method for controlling an image-capturing apparatus detachably mounted to a lens apparatus having an iris and a mechanical shutter, the image-capturing apparatus including an image-capturing unit configured to capture an image of a subject; a communication unit configured to enable communication with the lens apparatus; and a control unit configured to perform an image generating operation using a video signal supplied from the image-capturing unit, the method comprising:

capturing an image of a subject and supplying a video signal of the image to the control unit;

communicating with the lens apparatus;

performing an image generating operation using the supplied video signal; and controlling, on the basis of information received via the communication with the lens apparatus, timing of the image generating operation performed together with a plurality of opening and closing operations of the mechanical shutter, wherein the information is regarding the mechanical shutter disposed in the lens apparatus.

8. A method for controlling a lens apparatus having an iris and a mechanical shutter detachably mounted on an image-capturing apparatus, the method comprising:

performing an opening and closing operation of the mechanical shutter;

reading out information, used when the opening and closing operation of the mechanical shutter is repeated a plurality of times, from a storage unit; and sending the information to the image-capturing apparatus, wherein the information is used for controlling shooting operation performed in the image-capturing apparatus.

9. A computer readable medium containing computer-executable instructions for controlling an image-capturing apparatus detachably mounted to a lens apparatus having an iris and a mechanical shutter, the image-capturing apparatus including an image-capturing unit configured to capture an image of a subject; a communication unit configured to enable communication with the lens apparatus; and a control unit configured to perform an image generating operation using a video signal supplied from the image-capturing unit, the computer readable instructions comprising:

computer-executable instructions for capturing an image of a subject and supplying a video signal of the image to the control unit;

computer-executable instructions for communicating with the lens apparatus;

computer-executable instructions for performing an image generating operation using the supplied video signal; and computer-executable instructions for controlling, on the basis of information received via the communication with the lens apparatus, timing of the image generating operation performed together with a plurality of opening and closing operations of the mechanical shutter, wherein the information is regarding the mechanical shutter disposed in the lens apparatus.

10. A computer readable medium containing computer-executable instructions for controlling a lens apparatus having an iris and a mechanical shutter detachably mounted on an image-capturing apparatus, the medium comprising:

computer-executable instructions for performing an opening and closing operation of the mechanical shutter;

computer-executable instructions for reading out information, used when the opening and closing operation of the mechanical shutter is repeated a plurality of times, from a storage unit; and computer-executable instructions for sending the information to the image-capturing apparatus, wherein the information is used for controlling shooting operation performed in the image-capturing apparatus.

* * * * *